United States Patent
Sparks

[11] Patent Number: 6,034,738
[45] Date of Patent: Mar. 7, 2000

[54] ON-SCREEN DISPLAY TIMING

[75] Inventor: Bradley Alan Sparks, Carmel, Ind.

[73] Assignee: Thomson Consumer Electronics, Inc., Indianapolis, Ind.

[21] Appl. No.: 09/029,787

[22] PCT Filed: Sep. 13, 1996

[86] PCT No.: PCT/US96/14732

§ 371 Date: Mar. 9, 1998

§ 102(e) Date: Mar. 9, 1998

[87] PCT Pub. No.: WO97/10681

PCT Pub. Date: Mar. 20, 1997

[30] Foreign Application Priority Data

Feb. 14, 1996 [GB] United Kingdom ................... 9603332

[51] Int. Cl.[7] .............................. H04N 5/445; H04N 5/91
[52] U.S. Cl. .......................... 348/564; 348/569; 386/46; 386/95
[58] Field of Search .................................. 348/564, 569, 348/589, 600, 722, 552, 558, 565, 567, 563; 386/1, 46, 52, 55, 64, 65, 125, 126, 111, 112; 345/228, 328; 360/31

[56] References Cited

U.S. PATENT DOCUMENTS

| | | | |
|---|---|---|---|
| 5,097,348 | 3/1992 | Suetaka .................................... | 358/335 |
| 5,428,400 | 6/1995 | Landis et al. ........................... | 348/569 |
| 5,515,173 | 5/1996 | Mankovitz et al. .................... | 358/335 |
| 5,598,352 | 1/1997 | Rosenau et al. ....................... | 364/514 A |
| 5,815,634 | 9/1998 | Daum et al. ............................ | 386/96 |
| 5,841,987 | 11/1998 | Blatter et al. ........................ | 395/200.66 |
| 5,881,203 | 3/1999 | Fujinami et al. ........................ | 386/96 |
| 5,937,138 | 8/1999 | Sato ......................................... | 386/52 |
| 5,974,221 | 10/1999 | Kato et al. ............................... | 386/68 |

FOREIGN PATENT DOCUMENTS

| | | |
|---|---|---|
| 220007 | of 0000 | European Pat. Off. . |
| 529834 | of 0000 | European Pat. Off. . |

*Primary Examiner*—Andrew I. Faile
*Assistant Examiner*—Kieu-Oanh Bui
*Attorney, Agent, or Firm*—Joseph S. Tripoli; Joseph J. Laks; Francis A. Davenport

[57] ABSTRACT

The absence of MPEG processing in a consumer digital recorder player may preclude on-screen message display of recorder status. Various methods are disclosed which facilitate the on-screen display of recorder player status messages. A first embodiment returns a reproduced decoded, analog video signal (102) to the digital recorder player (200) for insertion of status messages. In a further embodiment recorder message data (221) is coupled to the digital signal decoder (100,117,520) for inclusion with the decoded analog video signal (102). In a another embodiment a recorder message command (TAG/CMD) is coupled to the decoder (100,510) to access recorder specific graphical messages. In yet a further embodiment, recorder message data (221) is tagged and coupled to the decoder (100,510) to select recorder specific graphical messages if available or to display recorder message data. In yet another embodiment, digital or analog operating mode determines recorder (200) message display timing with respect to a reproduced decoded video signal.

14 Claims, 2 Drawing Sheets

ON-SCREEN DISPLAY TIMING

This invention relates to the field of digital video recording and in particular to coupling between various equipment components.

BACKGROUND OF THE INVENTION

A digital video signal may be processed to form a bit stream having a reduced bit rate. Such processing for bit rate reduction may be implemented according to an MPEG compression method, and may be formatted, for example, with an MPEG compatible structure, such as that employed in a digital satellite system, for example DSS™ or the proposed Grand Alliance or GA terrestrial system.

A consumer video recorder may be adapted to provide recording capabilities for both analog signals and digitally encoded signals processed for example, for compatibility with an MPEG standard and having GA or DSS™ signal formats. The adapted consumer video recorder may be considered as two electronic systems within one box, sharing a recording mechanism, servo and control systems. A conventional analog recording method may be employed where an analog luminance signal component frequency modulates an RF carrier and an analog chrominance signal component amplitude modulates a second RF carrier. When reproduced, the two modulated signals are demodulated, combined and coupled out for video display.

During both record and replay operating modes, on-screen display messages may indicate operational status, warning conditions, tape duration, record time, time code etc., of the video recorder. These on-screen display messages or OSDs may be added to the analog video output signal to provide the user with recorder status information.

Digital recording may be achieved by using the consumer video recorder as a digital bit stream recorder/reproducer. The MPEG compatible signal, for example transport packets, may be recorded by reformatting the transport packets to facilitate recording and reproduction. For example, the transport packets may be buffered and error detection and correction data words computed and added. The bit stream with error correction added may be formatted into recording data blocks or sync blocks containing a predetermined number of bytes which may be accommodated in each recorded track. The sync block signal may be coded to render the signal more suitable for digital recording, for example, to remove any DC component, or provide spectral shaping of the recorded signal, such modulation may be produced by "code book" type encoding. In a playback mode the recording processes are effectively reversed, for example, the "code book" encoding is decoded, errors are detected and corrected and the sync block formatting is removed restoring the bit stream to the original MPEG like format.

To minimize the additional cost increment of digital recording and reproduction, MPEG decoding and encoding is not included in the recorder. Thus the recorder must process the MPEG like packet stream without changes or additions. Hence the recorder provides a program delay or time shifting facility. However, recorder status and warnings and tape timer displays, which during analog operation are added to the analog output signal, may be absent during digital operating modes. Hence, recorder status, etc. may only be ascertained by observation of the recorder control panel.

System interconnection and control between a digital signal source, recorder and monitor display may be simplified by the use of a bidirectional data bus. However, any interconnection additional to that of an analog system may present the user with incomprehensible installation complexity and confusion. A simple interconnection method is required which may provide coupling between a digital signal source and display regardless of a recorder's operational status. The simple interconnection method must facilitate both analog and digital recorder operation by utilizing the same interconnection system. In addition, recorder status and warning messages are required for user display during both analog and digital recorder operating modes.

SUMMARY OF THE INVENTION

Recorder status, warnings and tape timer displays may appear temporally displaced when combined with a decoded video signal. This temporal displacement is advantageously synchronized by the following inventive arrangements. A digital recording and replay apparatus, comprises a transducer for reproducing a digital encoded bit stream signal from a recorded medium. Replay electronics are coupled to the transducer for processing the digital encoded bit stream signal to produce an output signal bit stream for decoding. A receiving means receives a video signal decoded from the output signal bit stream and adds a display message to the video signal. A message generator is responsive to an operating mode of the apparatus and generates the display message. A control means is coupled to the message generator to synchronize generation of the display message to the video signal.

DETAILED DESCRIPTION

Figure 1:
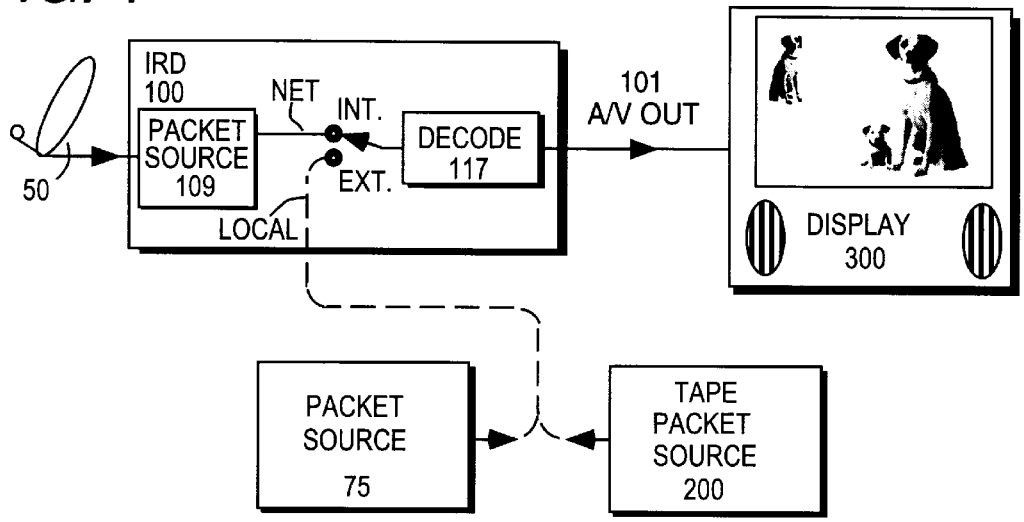
FIG. 1 depicts in block diagram form packetized signal sources coupled for decoding and display.

A simplified consumer digital audio video system is illustrated in FIG. 1. Sources of packetized, compressed audio video and control data are shown coupled for decoding and display. A receiver, IRD 100 is depicted coupled to a receiving antenna 50, however, a modulated signal may be provided from a cable distribution network (not shown). The modulated packetized signal is tuned, demodulated and a user determined program is separated within the block indicated as PACKET SOURCE 109. An output of PACKET SOURCE 109 comprises a transport packet stream of audio video and control data which is MPEG decoded to produce audio and video signals by DECODER 117. The output from DECODER 117 is coupled for monitoring by display 300. Other sources of packetized signals are shown coupled with a dotted line as alternative data streams for MPEG decoding by decoder 117. Thus DECODER 117 may be utilized to decode transport streams from external packet sources thereby reducing the cost of these other sources. For example, PACKET SOURCE 75 may represent a computer forming a packetized output signal. Such a signal may be derived from a computer memory, or may originate from an external source such as a computer network. Such a computer source may reproduce compressed audio video and control data from disk memory. In addition, PACKET SOURCE 75 may represent a digital video disk player such as, for example, a DVD format device. A further source of transport packets may be provided by a magnetic tape player recorder, PACKET SOURCE 200, which may have a format in accordance with, for example, D-VHS or DVC standards.

Figure 2:
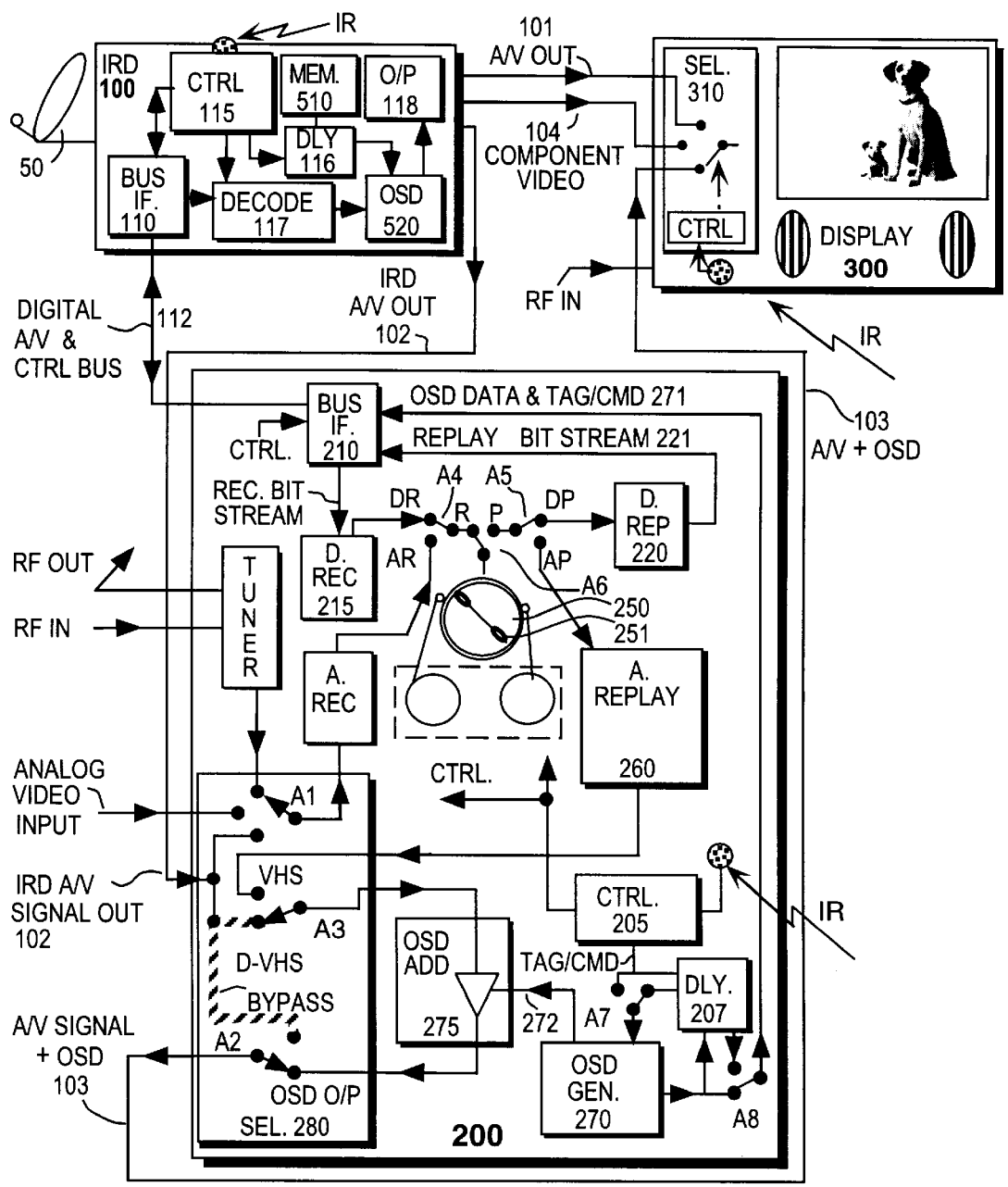
FIG. 2 shows an exemplary block diagram including various inventive embodiments.

A simplified consumer digital video receiver, recorder and display system is illustrated in the exemplary block diagram of FIG. 2. The system employs a digital video signal source, for example an integrated receiver decoder or IRD 100, an audio video monitor display device 300 and a digital video cassette recorder 200, for example employing a D-VHS or DVC format. In the illustrated system, a digital video representative signal is modulated on an RF carrier and received by an antenna 50. Antenna 50 is coupled to an integrated receiver decoder IRD 100. However, a modulated carrier may be delivered to receiver 100 by a cable distribution system (not shown). The integrated receiver decoder 100 is tuned to the RF carrier frequency and demodulates therefrom an MPEG compatible transport data stream modulation.

The transport data stream may be decoded to produce analog audio and video signals for immediate monitoring by audio video display 300. The decoded output signals are represented by signals 101 and 104, which are coupled between receiver, IRD 100 and display 300. Cost considerations may dictate that digital recorder 200 does not include MPEG encoding and decoding. Hence digital recorder 200 functions as a bit stream recorder/player, to provide time shifting or program delay capability. The omission of MPEG processing and the degree of complexity required to facilitate non-standard speed replay capability, precludes image reproduction in SHUTTLE, SLOW MOTION or TRICK-PLAY modes. Thus in summary, receiver 100 couples an MPEG compatible packet stream to digital A/V bus 112 for recording by recorder 200. Similarly a reproduced packet stream from recorder 200 is coupled back to the receiver for MPEG decoding, and audio/video generation. An additional consequence of omitting MPEG processing from the recorder is that status messages, in the form of on-screen display messages or OSDs, cannot be combined or added to the replay packetized bit stream. Thus the operational status of the recorder is not readily obvious to the user.

In addition, since recorder image data is only available during RECORD, PLAY and STOP modes, the user may be uncertain as to the responsiveness of the recorder following control commands.

For example, transitioning from PLAY to REWIND may result in the replay image switching for example, to the input bit stream, a condition known as electronics to electronics or E to E, or for example, the replay image may disappear and be replaced by frozen frame derived by the IRD, or perhaps the moving image may be substituted by a colored field. Thus the user may not readily associate these visual display effects as indicia of recorder mode responsiveness.

The system illustrated in FIG. 2, shows a first inventive interconnection arrangement where a demodulated transport bit stream is coupled from receiver IRD 100 to recorder 200 via a bidirectional data bus 112. The transport packet stream is coupled to the data bus via an interface port 110 and is received at recorder 200 by means of interface port 210. The interface ports are controlled via a control data stream which is carried on a separate conductor included with data bus 112. Control signals may be derived from user input by activation of control switches (not shown), or by user generated IR remote control commands. For example, a user may chose to monitor a digital audio video signal received by dish antenna 50. The receiver may be selected by touch or via a remote control, for example IR. Receiver selection may result in the automatic monitoring the display selection, i.e. the display is automatically switched to monitor the MPEG decoded audio video outputs. The user may select a digital RECORD mode which results in coupling the received transport stream from IRD 100 via bus 112 to the recorder and initiating recording. Similarly selection of a digital recorder PLAY mode results in a replayed data stream being coupled via bus 112 for decoding by decoder 117 of receiver 100.

The MPEG compatible, packetized signal is coupled to recorder 200 and processed for recording by block D. REC. 210. A buffer memory is included in block D. REC. 210, and buffers the data stream to establish a signal more suited for recording than the packetized signal comprising bursts of data with variable duration gaps. The buffered data stream is read from the buffer to form record format sync blocks which may be encoded with error detection/correction data words. The sync block formatted data stream may be modulated for recording as described, and coupled from recording block D. REC. 210 via a selector switch A4. Selector switches A4 and A5 are controlled responsive to the selected D-VCR operating mode. For example, in FIG. 2 switches A4 and A5 are shown for digital recording and reproduction, with switch contacts DR, digital record and DP digital playback coupling data streams to and from a rotating head assembly 250. For analog operation, switches A4 and A5 assume the alternate position as indicated by AR, analog record and AP analog playback. The sync block formatted data stream from D. REC. 210 is coupled to rotating head assembly 250 for recording on a magnetic tape.

In a PLAY mode the recorded sync block formatted data stream is reproduced from the magnetic tape by transducing heads 251 positioned on assembly 250. The recovered signal is demodulated by digital replay block D. Rep. 220, to remove any recording channel modulation. The replay signal is then subject to error detection and correction by means of the data words inserted prior to recording. Following error correction, the sync block formatting is removed and the bit stream restored to have substantially the same the packet format as that coupled to the recorder for recording. The packet stream from block D. Rep. 220 is coupled to interface port 210 which, responsive to the recorder PLAY mode couples the packet stream to the bi-directional data bus 112 for MPEG decoding by decoder 117.

Integrated receiver decoder 100 decodes the MPEG compatible packet stream and generates both video and audio output signals. For example, FIG. 2 illustrates video and audio output signals 101 and 102 and a component video signal 104, for example S-Video. However, these digitally reproduced video signals are without recorder status information usually provided by means of an on-screen display or OSD.

Receiver IRD 100, shown in simplified form in FIG. 2, comprises a controller, CTRL. 115, which provides overall control of the receiver, for example tuning, packet header control demultiplexing, bus interface control and selection of packet source for coupling to MPEG decoder 117. In addition the receiver status, or operational mode, may be indicated by means of an on-screen display message added to the decoded video signals. Controller 115 may construct an on-screen display message or may read a predetermined stored message from memory block MEM. 510. The on-screen display message or OSD is coupled to an OSD inserter or adder, block 520 where the message is formatted for analog video display and added or combined with the MPEG decoded video signal. The video with OSD signal is coupled out via output amplifier 118 for display by monitor display 300.

In FIG. 2 recorder player 200 includes an on-screen display generator, OSD. GEN. 270, coupled to a control system CTRL 205. In response to signals from the recorder control system 205, OSD generator 270 generates status or warning messages appropriate to the operation condition. These messages are formatted as video signals for insertion or inclusion with an analog video signal in block, OSD. ADD 275. Analog video signals are coupled to the on-screen display adder 275 from a video selector block SEL. 280.

Selector 280 is controlled by control system 205 and provides selection capability between various analog signal sources. For example, switch A1 provides analog input signal selection between a tuner derived signal, a baseband analog signal input and an MPEG decoded audio video output signal 102. The output from switch A1 is coupled for analog recording by block A. REC.

Selector switch A3 of SEL 280 advantageously provides selection of signal coupling to on-screen display adder 275. In FIG. 2 switch A3 is shown providing an inventive coupling of the video component of output signal 102 to the input of on-screen display adder 275. Thus, recorder player 200 status messages generated, for example during playback, may be added to video signal component 102 decoded from the output transport packet stream. Thus the digitally derived MPEG decoded replay signal with on-screen messages added, signal 103, may be viewed by display 300.

During analog operation of recorder player 200, switch A3 couples an analog replay signal, shown as signal VHS, to on-screen display adder 275. Thus during analog operation OSD messages are added to the analog replay video signal. When digital recording is selected, OSD messages may be advantageously added to the analog video signal 102 decoded from the reproduced bit stream. Thus, by means of this advantageous feedback connection recorder status messages are combined with the video component and output as analog signal 103.

Switch A2 of selector SEL. 280 advantageously provides a connection which bypasses on-screen display adder 275 and allows output signal 102 to be coupled directly to monitor display 300. Thus the bypass action of switch A2 allows viewing of decoded output signals and removes the possibility of signal degradation due to adder 275. The bypass path A2 may be automatically selected when the recorder is OFF, in a STAND BY mode, or when viewing a decoded, non-recorded "live" bit stream. To permit viewing of decoded non-recorded signals during analog recording, the bypass switch may be manually activated. The advantageous bypass connection obviates unnecessary analog recorder signal processing, for example via the E/E recorder path which inherently degrades the digitally derived signal 102. In addition the advantageous bypass function may be facilitated, for example by mechanical contact, such that switch A2 allows receiver IRD 100 to be connected to monitor display 300 without regard to the operational status of recorder 200.

On-screen display generator 270 generates messages formatted with specific horizontal and vertical synchronizing timing such that when inserted into the video signal the message is displayed at a predetermined position on the display screen. However, when operating in the digital replay mode and employing the advantageous feedback connection discussed above, OSD messages may be advantageously generated with horizontal and vertical synchronizing timing which is different from that employed during analog recorder operation. This different horizontal and vertical synchronizing timing advantageously compensates for replay signal propagation and MPEG decoding delays encountered, for example, in receiver 100. Thus, the use of different OSD synchronizing timing advantageously achieves substantially the same predetermined message position in either analog or digital recorder operation.

During processing and MPEG decoding time delays may amount to periods of multiple frames. A multiple frame delay, or temporal offset, will result in an OSD message preceding an actual reproduced visual event. This temporal offset, where the recorder OSD message precedes a reproduced event, may be revealed as a consequence of a user control command and the delayed appearance of the corresponding reproduced image effect. The temporal offset may represent a more significant problem when displaying a recorded time code signal or the recorder tape timer. For example, during tape replay specific events may be noted from an on-screen display of the recorder tape timer or an OSD of a recorded time code signal. The noted times being used for subsequent location of the selected events. However, should the noted times be used as editing points, the resultant edited scenes will precede those scenes selected during previewing. The effect of the temporal offset between the message and the replay image may be advantageously eliminated by synchronizing the message and decoded visual image. The selection of editing points is additionally complicated by the MPEG signal structure which comprises groups of frames or GOPs. Since each group of frames includes only one intra coded frame or I frame, actual points at which edits between different pictures may be performed is limited to location may be limited to intra coded frames or I frames. Thus many replayed frames are excluded as possible edit points. Hence to facilitate edit point selection the tape timer or time code display may be synchronized with the decoded visual image to display only time code frames or tape times which correspond to intra coded frames. The OSD temporal offset may be synchronized with the decoded visual image by delaying, message generation, message communication, OSD presentation or by modifying the tape timer/time code numbers or count. In recorder 200 a delay, depicted as DLY. 207, may be selected by switches A7 or A8. For example, when decoded video signal 102 is fed back for recorder OSD message insertion at block 275, an OSD message command may be generated responsive to controller 205. The message command signal CMD, from controller 205 is illustrated coupled to switch A7 and delay DLY 207. Switch A7 is controlled responsive to the recording mode selected for recorder 200, i.e. analog or digital. Switch A7 is shown in the digital mode, and selects a delayed version of signal CMD from delay 207. The delayed command signal results in the generation and insertion of an OSD message which is substantially coincident with decoded video signal. An alternative arrangement employs switch A8 which may insert delay 207 into the output from the OSD generator 270. In this arrangement switch A7 is connected to the output of controller 205. Switch A8 may also be employed to delay coupling of signal CMD to bus 112 and IRD 100. The temporal offset between the OSD message and the decoded replay image may also be corrected in receiver 100 by the introduction of a delay, for example as depicted by DLY. 116, into either the memory accessing signal or the memory output signal. Synchronization of repay image and OSD may be achieved by various methods, for example, by means of a delay using a clocked data latch, shift register, monostable multivibrator, etc. A tape timer or time code OSD may be synchronized with the decoded image, for example during edit mode preview by arithmetic manipulation of the display numerals. Thus the selected image and associated display numerals may be entered to enable an electronic edit to be performed. During analog operation of recorder 200 the command signal CMD, from controller 205 is not delayed and switch A7 couples directly to generator 270.

In another inventive embodiment, on-screen display messages originated by recorder 200, may advantageously utilize the on-screen display capability of receiver 100. Recorder derived messages may be coupled via the control conductor of data bus 112 to receiver 100 for on-screen display insertion at block OSD 520 of FIG. 2. The recorder message data may be formatted as a text message by generator 270, to which a tag or label is appended. The tagged text message shown as signal 271 is coupled to controller 115 of IRD 100 for separation from other control bus data. Following separation the text message is coupled for display formatting and video insertion by OSD 520. The text message is generated responsive to OSD command signal CMD from controller 205. As described earlier, signal CMD may be subject to delay at block 207. However, the text message from block 270 may be delayed at an alternative point by switch A7 insertion of delay 207.

In a further inventive embodiment, receiver 100 includes a memory 510 which contains receiver on-screen display messages and OSD messages specific to recorder 200. Recorder specific messages may be accessed responsive to recorder on-screen display command signal, CMD, which may be coupled via the control bus to controller 115. In recorder 200 the on-screen display command signal CMD, is generated by controller 205 which in addition determines the message to be generated. Thus command signal CMD, may be advantageously coupled to receiver 100 to enable accessing and display formatting of recorder specific graphical messages stored in a memory 510.

In yet another inventive arrangement receiver 100 may adaptively select between the recorder text message or a receiver graphical message responsive to a recorder command. The selection between the recorder text or IRD graphical message display permits the interconnection of recorders and receivers of differing ages having different features and facilities. For example, an older receiver may be connected to a recently manufactured recorder thus, the receiver memory may not contain preprogrammed graphical messages to support recorder on-screen message presentation. Thus the receiver may display the simple text message generated by the recorder. Conversely, a more modern receiver may be preprogrammed with selections of graphical messages for a variety of products of various manufactured ages and these various graphical messages may be displayed in place of the recorder text message. Selection between simple text or graphical message is facilitated by the tag or label which is appended to the text message. For example, the tag or label may contain the command signal CMD which selects, and enables the required recorder specific message. In addition the label may provide sufficient data capacity to communicate recorder profile information relating to, for example, the date of recorder manufacture, model, version or revision level and serial number. When the text message with tag or label is received by controller 115, the tag or label is interpreted which results in the selection of a recorder specific graphical message from IRD memory 510. However, if the receiver memory is not preprogrammed with the specified recorder message or with a message specific to the recorder profile, the tag enables formatting and display of the appended simple text message. As described previously a delay element may be inserted to compensate for temporal and spatial displacement between the OSD message, text or graphical, and the replayed decoded image.

FIG. 2 illustrates a monitor display 300 having three analog signal inputs; audio video signals 101 and 103, and an audio and component video signal 104, for example, S-video or luminance and coloring components Y, Pr, Pb. In addition, display 300 may receive audio and video signals via radio frequency signals, depicted as RF IN. A signal selector 310, couples as is known, to video and synchronizing processing circuitry, not shown, which in combination generate an image display. Signal selector 310, may be controlled by user activated switches located on display 300, or by user initiated remote control commands transmitted via a modulated IR control stream. The three baseband input signal illustrated may be advantageously selected by automated control of selector switch 310. For example, selection of digital recording or replay modes may automatically select an input signal containing recorder OSD status display information. The recorder status OSD may be generated and originate as previously described. In addition, the provision of multiple baseband signal inputs may allow function specific device interconnection. For example, the direct viewing of a decoded, non-recorded, signal from IRD 100 may be facilitated by use of, for example, output signal 101, or component video signal 103, with IRD output signal 102 routed for recorder OSD insertion to form A/V signal 103.

Figure 3:
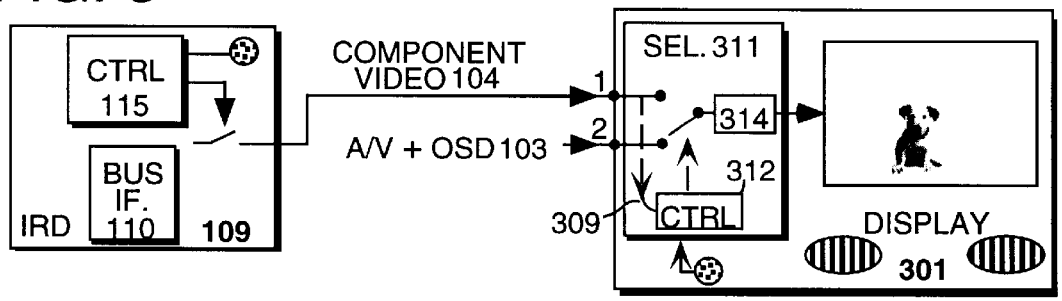
FIG. 3 is an exemplary block diagram showing a simplified switch including various inventive embodiments.

FIG. 3 illustrates the use of a reduced cost display, for example, as depicted as display 301. To reduce the display cost the number of signal inputs may be limited to, for example, an RF input, a component video or S-video input and one audio video signal input. The advantageous selection and bypass capability of selector 280 of FIG. 2, permits display 301 to monitor recorded, and non-recorded material via a single A/V input. However, the display may advantageously utilize the component video signal connection to determine and control the display input selection in addition to signal coupling. For example, since component video signals or S-VIDEO signals may be assumed to provide superior display image quality to that attainable from an NTSC encoded signal, the presence of such component signals coupled to a component signal input may automatically cause selection of the component signal source. Thus when both component and composite signals are coupled to display 301 inputs 1 and 2 respectively, the input controller has logic which predetermines selection of the component signal as a preferred input. However, this automated input selection may prevent monitoring of signals containing recorder specific on-screen display information coupled from recorder 200 of FIG. 2. However, the automated, preferential input selection may be advantageously utilized to enable remotely controlled selection of the audio video signal, for example signal 103 at input 2. Signals containing on-screen display information coupled via recorder 200 may be viewed on display 301 by an inventive control of component signal 104 by means of allowing or terminating output coupling signal 104 from IRD 100. For example, user selection of a non-recorded bit stream, i.e. received signal, will result in controller 115 of receiver 100 enabling generation or outputting of component signal 104, having for example, an S-VIDEO format. The selection of a recorded image signal for display will result in controller 115 terminating generation, or outputting of component signal 104. Thus controller 312 of monitor 301 is coupled to the component signal input terminal to senses via signal 309 the absence of signal 104 and causes input selector 311 to switch from the component input signal 104, on input 1 to, for example, audio video signal 103, on input 2 coupled via selector 280 of recorder 200 in FIG. 2.

We claim:

1. A digital apparatus (200) for reproducing a digital video representative signal stored on a recorded medium connected to a receiving device including a decoder, said apparatus comprising:
   - means for processing (251, 220) said digital video representative signal stored on the recorded medium to produce an output signal bit stream (221) for decoding by the decoder;
   - means for generating a display message representative of an operating mode of said apparatus;
   - means for receiving a decoded video signal representative of said decoded output signal bit stream from the decoder and said display message signal from said generating means for adding said display message to said decoded video signal; and
   - means coupled to said generating means for synchronizing generation of said display message signal with said decoded video signal.

2. The digital apparatus of claim 1, wherein synchronization of said display message signal with said decoded video signal is in response to detecting operation of said apparatus in a replay mode of operation.

3. The digital apparatus of claim 1, wherein said message generator generates a numeric display signal of one of tape time or time code by arithmetic manipulation for synchronization with said decoded video signal is in response to detecting operation of said apparatus in a replay mode of operation.

4. The digital apparatus (200) of claim 1, wherein said means for generating a display message is responsive to a tape timer or time code signal.

5. The digital apparatus (200) of claim 1, wherein said synchronizing means includes a delay means for delaying transmission of said message data signal to said display message combiner.

6. The digital apparatus (200) of claim 5, wherein said delay means (207) provides a delay equal to a decoding time of the decoder to thereby synchronize said display message signal with said decoded digital video signal.

7. The digital apparatus (200) of claim 1, wherein generation of said display message by said status generating means is in response to receipt of a user generated command signal.

8. The digital apparatus (200) of claim 7, further comprising an infrared receiver connected to said generating means for receiving an infrared signal (IR) from a remote control unit, said infrared signal controlling the operating mode of said apparatus (200).

9. A receiver device for receiving and decoding compressed digital video signals, said receiver device comprising:
   - receiving means (110) for receiving a compressed digital video signal (221) from a local source and a display message tag signal (271) representative of an operating state of said local source;
   - means for decoding (117) coupled to said receiving means (110) for decoding said compressed digital video signals (221) to form a video signal;
   - control means (115) coupled to said receiving means (110) for processing said display message tag signal to access a stored display message signal corresponding to said tag signal; and
   - means for combining said display message signal and said video signal to generate a combined video signal and formatting said combined video signal for display.

10. The receiver device of claim 9, wherein said display message signal accesses a stored message signal representing a numeric display of tape time corresponding to reproduced intra coded frames.

11. The receiver device of claim 9, wherein said wherein said compressed digital television signals has intra coded frames and non intra coded frames.

12. The receiver device of claim 11, wherein said tag signal represents media replay time information.

13. The receiver device as recited in claim 9, wherein said control means includes a memory device for storing a plurality of display message signals.

14. The receiver device of claim 12, wherein said plurality of stored message signals each relate to numeric displays of times corresponding to reproduced intra coded frames.

* * * * *